United States Patent [19]

van Montfoort et al.

[11] 4,111,842
[45] Sep. 5, 1978

[54] PROCESS FOR THE PREPARATION OF SUPPORTED CATALYSTS

[75] Inventors: Abraham van Montfoort, Geleen; Joseph J. F. Scholten, Sittard, both of Netherlands

[73] Assignee: Stamicarbon, B.V., Geleen, Netherlands

[21] Appl. No.: 802,533

[22] Filed: Jun. 1, 1977

[51] Int. Cl.$^2$ ............................................. B01J 21/18
[52] U.S. Cl. ................................. 252/447; 252/425.3; 423/387; 429/44
[58] Field of Search ................ 252/447, 425.3; 429/44

[56] References Cited

U.S. PATENT DOCUMENTS

| | | | |
|---|---|---|---|
| 2,692,295 | 10/1954 | Peters | 252/447 X |
| 2,840,609 | 6/1958 | Sauer | 252/447 X |
| 3,086,945 | 4/1963 | Cohn | 252/447 X |
| 3,629,145 | 12/1971 | Morikawa et al. | 252/447 X |
| 3,974,227 | 8/1976 | Berthoux et al. | 252/447 X |

Primary Examiner—Patrick P. Garvin
Attorney, Agent, or Firm—Cushman, Darby & Cushman

[57] ABSTRACT

A process for preparing activated carbon supported catalysts by mixing an activated carbon support having acid surface groups with an aqueous solution containing one or more cations selected from the groups IB and VIII of the Periodic System of Elements as well as Zn to effect cation exchange with the acid groups on the surface of the activated carbon support, separating the cation exchanged activated carbon. Said exchanged surface cations are thereafter reduced on the carbon support in the medium which is later to be subjected to the catalyzed reaction. The surface of the activated carbon support may be oxidized to increase the number of acid groups per unit area prior to ion exchange.

5 Claims, 1 Drawing Figure

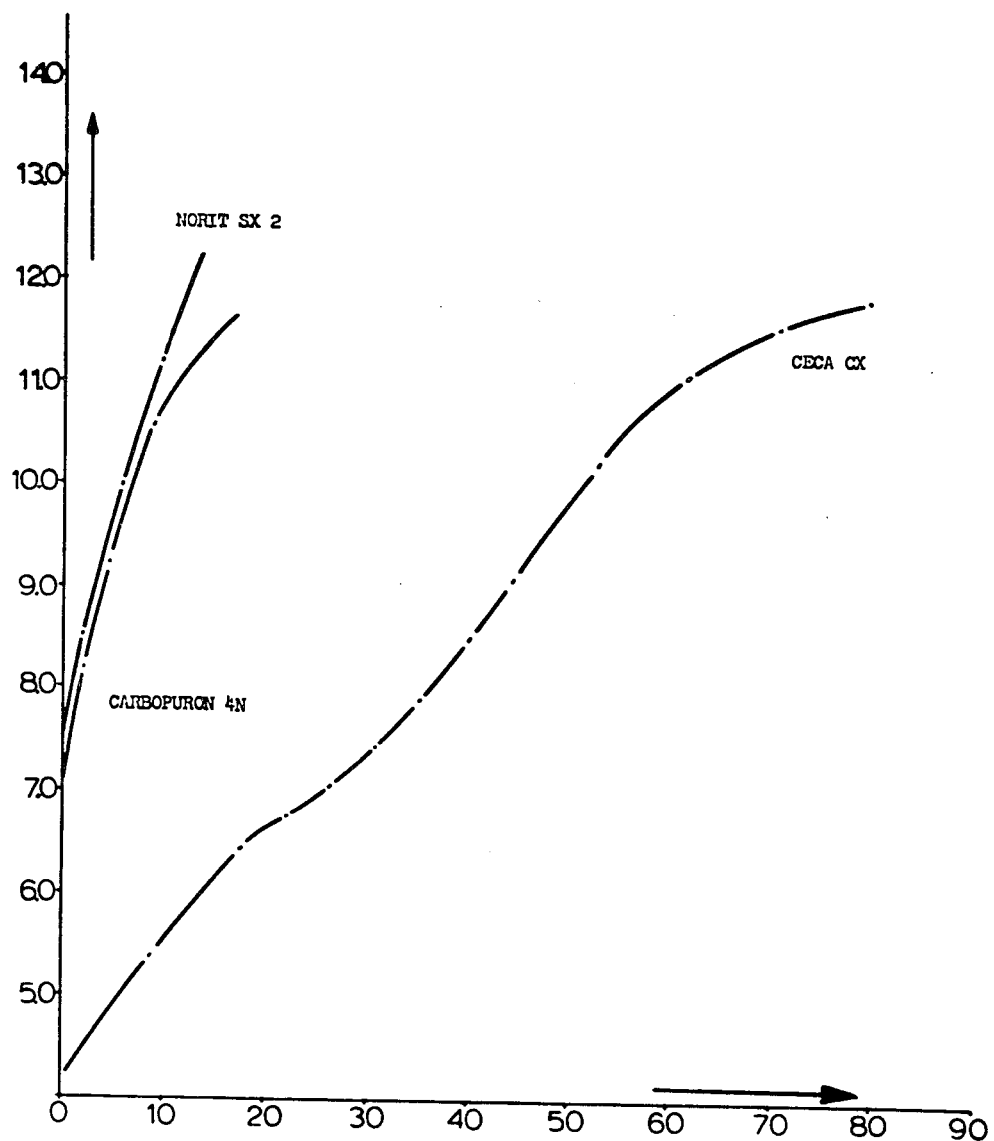

PROCESS FOR THE PREPARATION OF SUPPORTED CATALYSTS

BACKGROUND OF THE INVENTION

The present invention relates to a process for preparing metal coated activated carbon supported catalysts by effecting a cation exchange with acid groups on the surface of an activated carbon support, separating the thus treated activated carbon support.

The present invention is an improvement of the process described by Furuoya, et al. for preparing palladium-on-carbon catalysts, in which the palladium is deposited as metal crystallites. Furuoya's method was described in *International Chemical Engineering*, volume 10, pages 333 to 338 (April 1970), the entire disclosure of which is hereby incorporated by reference. Furuoya's method provides for oxidizing an active carbon support with nitric acid; impregnating the oxidized carbon support for 48 hours with an aqueous solution containing a palladium-amine complex; isolating the palladium impregnated activated carbon support by filtration, washing and drying; and activating the palladium impregnated activated carbon support by reduction with hydrogen, oxidation in air, and a final reduction in hydrogen. The method of preparation is obviously laborious, for example, activated carbon oxidized with nitric acid is extremely difficult to filter because it forms a strongly coherent colloidal filter cake.

Another disadvantage of the Furuoya process is that the carbon support is saturated throughout with palladium-amine solution which upon drying may result in the formation of large metal crystallites which do not exhibit desirable catalytic properties.

The present invention is an improvement in the Furuoya process which permits the production of a catalyst of superior quality obtained with less difficulty in the filtration operation, and further without requiring the laborious activation treatment described above.

SUMMARY OF THE INVENTION

The present invention is directed to a process for preparing a catalyst comprising a catalytically active metal deposited on the surface of an activated carbon support and, filtered.

The main object of the present invention is to provide a process for preparing an activated carbon supported catalyst in which the catalyst can be easily activated by reduction in the reaction medium which it is intended to catalyze.

It is another object of the present invention to produce an activated carbon supported catalyst which contains catalytically active metal adsorbed along the surface of the support, without depositing large crystallites of the catalytically active metal in the interior of the support.

Still another object of the present invention is to provide a process for oxidizing the surface of an activated carbon support which is more easily filtered.

Other objects of the present invention will be apparent to those of ordinary skill in the art from the detailed description of the invention which follows.

The objects of the present invention are satisfied by a process of preparing an activated carbon supported catalyst including mixing activated carbon having acid surface groups with an aqueous solution containing groups on the surface of the activated carbon with a metal or a metal complex cation of the Groups IB and VIII of the Periodic System of Elements as well as zinc. After this cation exchange, the metal coated activated carbon support is filtered and subjected to reduction in the reaction medium it is intended to catalyze to form a free metal coated activated carbon supported catalyst.

BRIEF DESCRIPTION OF THE DRAWING

The FIGURE shows the titration curve for several types of activated carbon titrated against barium hydroxide. The milliequivalents of barium hydroxide mixed per 100 grams of activated carbon are shown along the horizontal axis, while the pH is shown along the vertical axis. These titration curves reflect the number of acid groups per unit surface area of the activated carbon. The number of acid groups per unit surface area of the activated carbon support is of course of great interest because it is a measure of the number of sites which may be replaced by a catalytically active metal cation in the ion exchange reaction which forms a portion of the present invention. It can be seen from these titration curves that for example the activated carbon known as type CX manufactured by CECA of France* possesses a large number of acid groups per unit surface area. In general, activated carbon with a large number of acid groups per unit surface area is particularly suited as a support in the process of the present invention. Different activated carbons may be compared by comparing the milliequivalents of barium hydroxide per 100 grams of activated carbon required to achieve a pH of 7.

*CECA-COMP., CACA, 11, Avenue Morane Salnier, 78140, Velizy-Villacoublay, France.

DETAILED DESCRIPTION OF THE INVENTION

The supporting material used in the practice of the present invention is activated carbon containing acid surface groups. Any form of activated carbon containing acid suface groups may be used, including activated carbon prepared from peat, coal, bone, etc. In addition graphite and carbon black may be used provided they contain acid surface groups. Suitable activated carbons are commercially available, and are known as hydrophilic activated carbon, i.e. activated carbon suitable for the treatment of liquids. The number of acid surface groups per unit surface area of the activated carbon can be determined by titration in the manner well known in the art. The titration of activated carbon to determine the number of acid surface groups per unit surface area is discussed by B. R. Puri in *Chemistry and Physics of Carbon*, edited by Philip L. Walker, Jr., in chapter 6, pages 229 et seq. (New York 1970), which is hereby incorporated by reference. The titration of three commercially available forms of activated carbon is illustrated in the drawing.

In accordance with the present invention, it is possible to increase the number of acid surface groups per unit area of the activated carbon support by subjecting the activated carbon to an oxidation treatment with an oxidizing agent such as oxygen, ozone, potassium peroxydisulfate, potassium nitrate, nitrogen monoxide or nitrogen dioxide. However, as an aspect of the present invention, it has been found particularly desirable to oxidize the surface of an activated carbon to increase the number of acid surface groups per unit surface area using hydrogen peroxide. Applicants have discovered that by using hydrogen peroxide to oxidize the surface of an activated carbon, it is possible to control the additional number of acid surface groups produced per unit surface area of activated carbon while at the same time producing an oxidized activated carbon material which is easily filtered. As explained above, this is a significant advantage when viewed in comparison with the prior art process of oxidizing activated carbon with nitric acid.

Increasing the number of acid surface groups per unit surface area by oxidation with hydrogen peroxide in accordance with the present invention is particularly important in those cases where it is desired to deposit relatively large quantities of catalytically active metal on the activated carbon support by means of ion exchange. As those in the art are aware, the amount of catalytically active metal that can be deposited upon the activated carbon support depends not only on the number of acid groups per unit surface area of the activated carbon support, but also on the accessible surface area of the activated carbon support (i.e. the surface area measured by the BET method in square meters per gram), and on the concentration of the metal cations in the aqueous solution with which the oxidized activated carbon support is treated.

In the manner described by Furuoya, and also described in Netherlands patent application No. 75-02968, published Sept. 15, 1976, metals forming positive ions in solution can be deposited on an activated carbon support having acid surface groups. In addition, complex ions carrying a positive charge can also be exchanged with acid groups on the surface of an activated carbon support. The catalytically active metals which are contemplated in the process of the present invention are silver, gold, cobalt, copper, iron, iridium, nickel, osmium, palladium, platinum, rhodium, ruthenium and zinc. Each of these metals is available in the form of simple soluble salts yielding positively charged metal cations in aqueous solution. Complex soluble salts of many of these metals are also available, yielding complex positively charge ions containing the catalytically active metal in aqueous solution. It is contemplated within the scope of the present invention that more than one catalytically active metal may deposit upon the surface of an activated carbon support by starting with a mixture of two or more simple or complex soluble salts of the above-mentioned catalytically active metals in solution. Ion exchange of the various cations in the solution with the acid surface groups of the activated carbon results in a distribution of alloy-forming metal ions on the surface of the activated carbon support. In the subsequent reduction homogeneous alloy particles are formed on the surface of the activated carbon support.

Another aspect of the present invention is a two-step ion exchange on the surface of an activated carbon support. Such a two-step ion exchange is desirable when a complex ion is to be deposited on the surface of an activated carbon support, but the complex ion is not stable in the presence of an acid and is therefore liable to decompose under the influence of the acid groups on the surface of the activated carbon support. Under these circumstances, it is contemplated within the scope of the present invention to first exchange the acid groups on the surface of an activated carbon support with alkali metal cations, and subsequently exchange the alkali metal cations with the complex ions of the catalytically active compound.

The amount of catalytically active metal which can be deposited on the surface of an activated carbon support by exchanging acid groups with positively charged metal ions in the practice of the present invention can be varied from about 0.1% to about 10% by weight, based on the weight of the finished catalyst.

The metal ion exchange process is accomplished by stirring an aqueous solution of the catalytically active metal to be deposited, as described above, with activated carbon for a period from about 10 minutes to about 24 hours and at a temperature from about 10° C. to about 80° C. After the catalytically active metal is deposited on the surface of the activated carbon support, the activated carbon support is separated from the aqueous solution by filtration, and may be dried in the conventional manner. It is however an advantage of the present invention that the catalyst need not be dried before it is reduced. Following deposition of a catalytically active metal on the activated carbon support the catalyst is reduced in the reaction medium it is intended to catalyze.

Using the process of the present invention, surface type activated carbon supported catalysts can be prepared in an efficient manner from granules, pellets or other forms of activated carbon or a material containing activated carbon by subjecting the granules, pellets or other articles to the metal exchange and reduction processes described above.

Palladium-on-carbon, platinum-on-carbon, and alloys of palladium/platinum-on-carbon catalysts made according to the process of the present invention are useful for catalyzing the reduction of nitrate ions or nitrogen monoxide with hydrogen in a strongly acid medium in the preparation of hydroxylamine.

The surface-type activated carbon supported catalysts according to the present invention can also be used as electrodes in fuel cells. For example, an electrode consisting of a noble metal on an activated carbon support can be prepared according to the process of the present invention.

While the invention will be further described with reference to the following examples, it will be understood that it is not intended to limit the invention to the following examples. On the contrary, it is intended to cover all alternatives modifications and equivalents as may be included within the spirit and scope of the invention as defined by the claims.

EXAMPLES

Example I

Activated carbon made by CECA of France, type CX, was oxidized with hydrogen peroxide at 40° C. for 20 hours. Titration of the activated carbon before and after treatment with hydrogen peroxide showed that additional acid groups were present after the hydrogen peroxide treatment. After the hydrogen peroxide treatment, the activated carbon support was subjected to ion exchange with a $Pd(NH_3)_4Cl_2$ solution and a reduction process to produce a surface-type catalyst according to the present invention which was found to contain approximately 10 percent by weight of palladium. By comparison, an activated carbon sample not treated with hydrogen peroxide but subjected to the same ion exchange was found to contain approximately 2 percent by weight of palladium.

Example II 20 g of activated carbon, made by CECA of France, type CX, with an accessible surface area (i.e. BET area) of 1055 $m^2/g$ was stirred with 120 ml of distilled water for ½ hour in order to expel air and other adsorbed gases. Next, 105 ml of a palladium amine chloride, Pd(NH$_3$)$_4$Cl$_2$, solution containing 2.2 g of palladium (calculated as metal) were added, whereupon the solution was stirred for 20 hours at room temperature to exchange surface protons against Pd(NH$_3$)$_4$++ ions. Subsequently, the solid mass was separated by filtration, and dried for 6 hours at 60°–70° C. One fifth of the palladium in the solution deposited on the active carbon. With the aid of the catalyst prepared in this way several experiments were carried out:

a. A minor portion of the catalyst was subjected to basic hydrolysis and reduction with alkaline methanol. The experiment did not yield a suitable catalyst because the dissolved palladium particles were present in colloidal form.

b. Another portion of the catalyst was used, without further treatment, for the catalytic preparation of hydroxylamine from nitrate ions at 30° C. For this purpose hydrogen gas (80 l/h) was fed into 1 liter of an aqueous buffer solution which contained 207 cm$^3$ of phosphoric acid (85%-concentration), 82 g of sodium hydroxide and 198 g of NaNO$_3$, whereupon 750 mg of the catalyst was added and dispersed by stirring. The activity of the catalyst was measured and expressed in grams of hydroxylamine per gram of metal/hour. The result of the measurements is given in the Table, Expt. 1.

c. A small portion of the catalyst was reduced with hydrogen gas prior to use in the catalytic preparation of hydroxylamine from nitrate ions. For this purpose, nitrogen gas containing 1 percent by volume of hydrogen gas was passed over the catalyst at the rate of 20 liters per hour in a pyrex glass tube at 300° C. for 1 hour. The reduction was then continued for 1 hour at 300° C. with a mixture of 50% by volume of nitrogen gas and 50% by volume of hydrogen gas, supplied at the rate of 20 liters per hour, after which cooling to room temperature was effected in a stream of pure nitrogen. The results are shown in the Table, Expt. 2.

For the purpose of comparison catalysts were prepared according to the process of the Netherlands patent application No. 75/02968, starting from the following active carbons. CECA type CX, Carbopuron type 4N, Carbopuron type 4N without basic hydrolysis and reduction, and Norit type SX 2 (the reduction was carried out with hydrogen). The results are shown in the Table, Expt. 4, 5, 6 and 7. Also for comparison a catalyst was prepared according to the method described by Furuoya. The result obtained with the catalyst is shown in the Table, Expt. 3.

Table

| Exp. no. | Catalyst preparation | BET surface area (m$^2$/g) | Acidity | Activity g NH$_2$OH/g Pd/h |
|---|---|---|---|---|
| 1 | 1.9% wt Pd as Pd (NH$_3$)$_4$++ present on CECA CX, prepared according to the invention | 1055 | strongly acid | 24.5 |
| 2 | 1.9% wt Pd on CECA CX prepared by ion exchange and separate reduction with H$_2$ at 300° C | 1055 | strongly acid | 20.5 |
| 3 | 10.7% wt Pd on CECA CX prepared according to the method described by Furuoya | 1055 | strongly acid | 2.6 |
| 4 | 7% wt Pd on CEDA CX prepared according to Neth. patent application 7,502,968 | 1055 | strongly acid | 18.9 |
| 5 | 9.4% wt Pd on Carbopuron 4N prepared according to Neth. patent application 7,502,968 | 895 | weakly acid | 19.9 |
| 6 | 9.4% wt Pd on Carbopuron 4N prepared according to Neth. patent application 7,502,968 but with omission of the basic hydrolysis and reduction | 895 | weakly acid | 6.3 |
| 7 | 10.6% wt Pd on Norit SX-2 prepared according to Neth. patent application 7,502,968 but with H$_2$-reduction at 300° C | 1090 | weakly acid | 6.7 |

Comparison of the results of experiments 1 (according to the invention) with those of the other experiments (according to other processes) shows that the process of the invention yields a catalyst possessing the highest activity.

Thus it is apparent that there has been provided, in accordance with the invention, a process for preparing supported catalysts that fully satisfies the objects, aims and advantages set forth above. While the invention has been described in conjunction with specific examples thereof, it is evident that many alternatives, modifications, and variations will be apparent to those skilled in the art in light of the foregoing description. Accordingly, it is intended to embrace all such alternatives, modifications and variations as fall within the spirit and broad scope of the following claims.

What is claimed is:

1. A process for preparing an activated carbon-supported catalyst, which consists essentially in
   mixing an activated carbon having acidic surface groups thereon with an aqueous solution containing at least one catalytically active metal cation or metal complex cation selected from the class consisting of metals of Group IB and VIII of the Periodic System of Elements and zinc, whereby said catalytically active cation is transferred to the surface of said activated carbon by ion exchange,
   separating said thus treated activated carbon from said aqueous solution, and thereafter
   reducing said transferred surface cations on said activated carbon in a reaction medium to be catalyzed using the catalyst produced, and which is inert to said reduction,
   so that a free metal coated activated carbon-supported catalyst composition is obtained.

2. The process according to claim 1 wherein the surface of said activated carbon support is oxidized with hydrogen peroxide prior to mixing said activated carbon support with said aqueous solution.

3. A catalyst produced by the process according to claim 1.

4. The catalyst produced according to the process of claim 1 and including from 0.1% to 10% by weight of said catalytically active free metal.

5. The process according to claim 1, wherein a mixture of said catalytically active metal cations or metal complex cations is employed, whereby said activated carbon support is coated with a said mixture of free metals.

* * * * *